ated Feb. 24, 1959

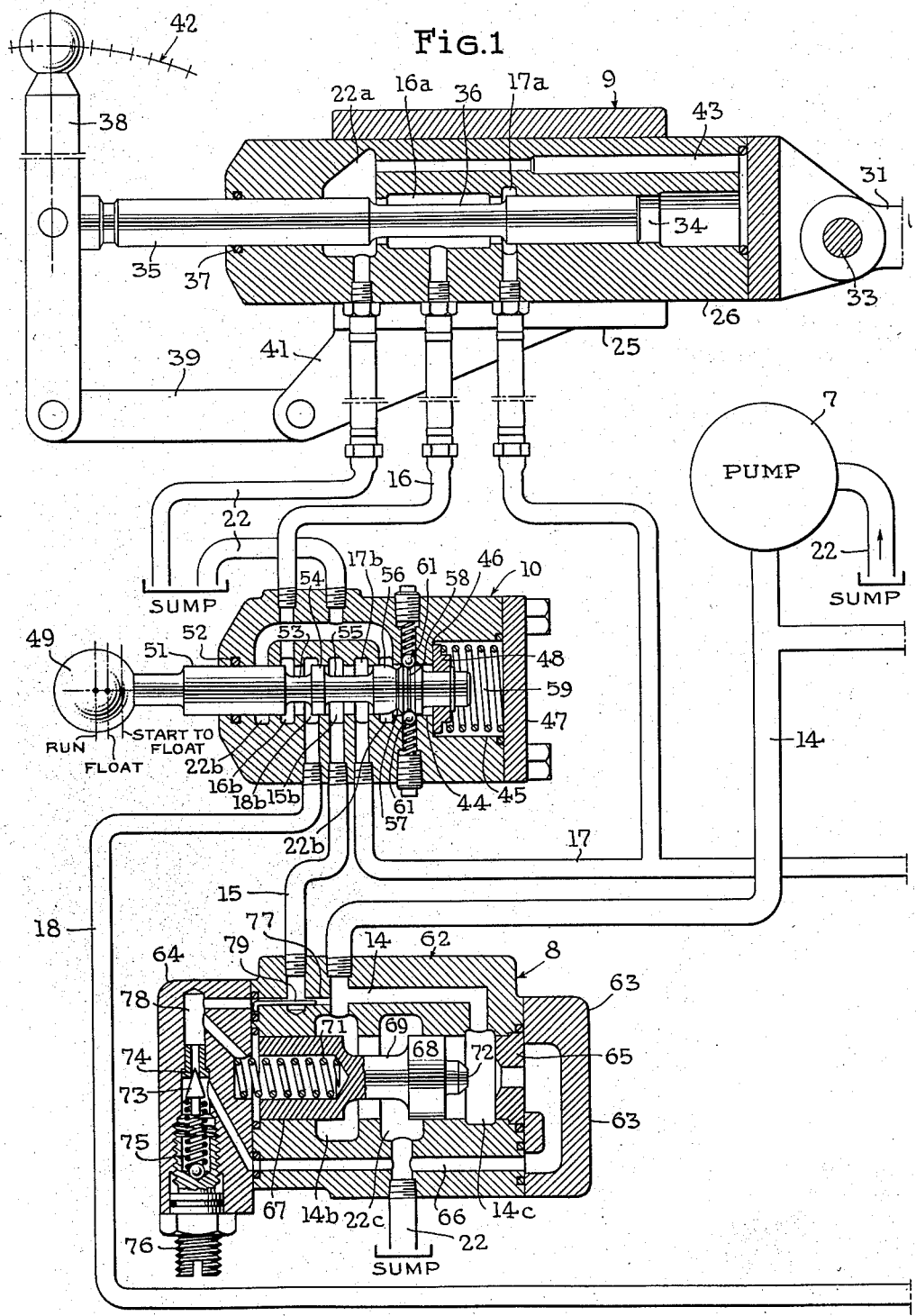

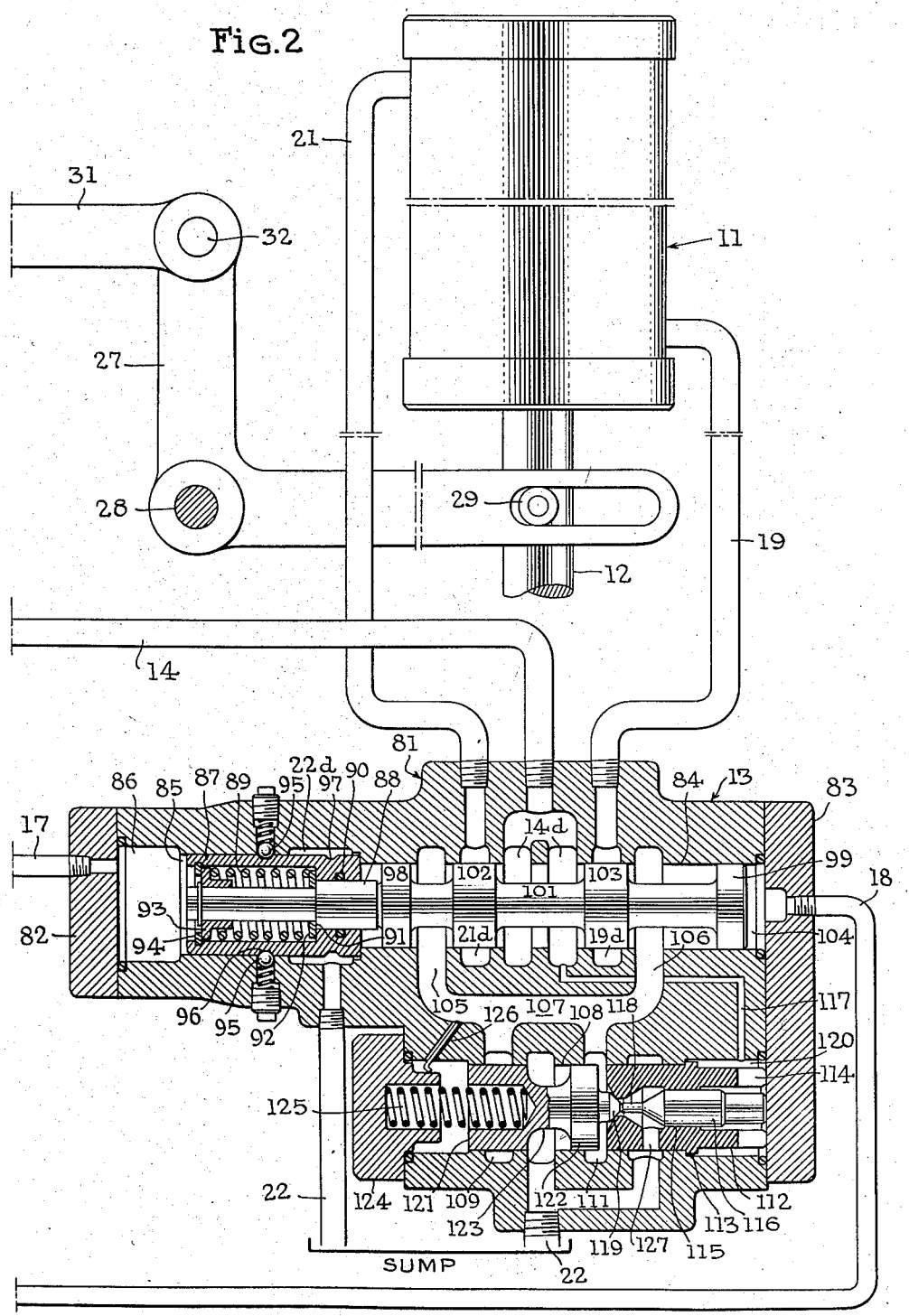

United States Patent Office 2,874,681
Patented Feb. 24, 1959

2,874,681

HYDRAULIC FOLLOW-UP CONTROL FOR BULLDOZERS AND THE LIKE

Henry A. Vander Kaay, Royal Oak, Mich., assignor to The New York Air Brake Company, a corporation of New Jersey Application April 29, 1955, Serial No. 504,727

10 Claims. (Cl. 121—41)

This invention relates to hydraulic controls and particularly to hydraulic controls for components of earthmoving machinery. In the present disclosure the invention will be described as applied to control of the vertical movements of the blade of a bulldozer.

In the illustrated embodiment the control is exercised upon a double acting piston motor. The cylinder of this motor is mounted on the chassis, and its piston rod is connected with the blade-carrying frame.

Movements of the motor piston are controlled by a piloted valve which is a double-acting balanced piston valve, biased in one direction by supply pressure acting on a small piston area, and normally subject to the centering action of a double-acting centering spring assembly. The bias is opposed by a lower pressure derived from supply pressure by a servo-pilot valve and acting on a considerably larger piston area. The centering spring assembly urges the valve to a hold position, so that normally, when supply pressure is low, hold condition is established.

The piloted valve has a float position, outside its normal range of motion, to which it may be forced by an abnormal pressure differential. To reach this position it must overpower impositive detents and shift a stop plunger which has two limiting positions, in each of which it sustains the centering spring assembly. In this function it is controlled by a separate pilot float valve, which disconnects the servo-pilot valve.

Normally the piloted valve is controlled by the servo-pilot valve comprising two coacting components, one manually shiftable, and the other shifted by the double-acting piston motor through a servo-follow-up connection.

Associated with the piloted valve is a flow-control valve which moderately restrains exhaust flows, and so keeps the working spaces of the double-acting piston motor liquid-filled.

Oil is supplied by a constantly running pump whose delivery is led to the piloted valve and also to a combined relief and unloading valve. The delivery line is in free communication with the unloading portion of this valve (which normally is open), is in restricted communication with a supply branch which leads through the pilot float valve to the servo-pilot valve, and is in still more restricted communication with the control unit of the relief and unloading valve.

When the pilot float valve is in its normal "run" position, and consequently not in control, the supply branch furnishes a low biasing pressure to the piloted valve and supplies a continuous flow of low pressure motive fluid to the servo-pilot valve through which it escapes to sump so long as the servo-pilot valve is in balanced flow condition. The servo-pilot valve is then acting to derive the above mentioned lower pressure which acts on the larger piston area of the piloted valve. If the servo-pilot valve is moved from balanced flow position, it retards outflow through itself and converts the relief and unloading valve from a low pressure unloader to a high pressure relief valve, thus raising the pressure of oil supplied. Also it changes the relationship between the pressures acting on the small and large piston areas of the piloted valve, causing the piloted valve to move.

The pilot float valve is interposed in the connections to the servo-pilot valve. In "run" position, it leaves the servo-pilot valve in control. The pilot float valve has, however, two other positions in each of which the servo-pilot valve is cut out of control. The first of these two other positions, called "start to float" position, is reached by manual shift full-stroke against a light spring bias. It initiates float conditions, and may be used by the operator to impose such restraint on exhaust flows from the motor and from the pump as will assure desirably rapid lowering of the blade into contact with the ground with a minimum tendency toward cavitation, both in the motor and in connecting passages. As a consequence the motor is liquid-filled and the blade may be at once shifted under power. The second of these two positions, called "float" position, is reached when the spring bias is allowed to return the pilot float valve part way toward "run" position. Then the pump is unloaded and both working spaces of the motor are connected together and with supply and exhaust.

The pilot float valve must be manually restored to "run" position, and when it has been restored the servo-pilot valve resumes control and forthwith causes the blade to move to whatever position the servo-pilot valve then indicates.

Separate manual actuators are provided for the two pilot valves, and the location of at least the actuator for the float pilot valve is subject to a wide range of choice.

A simplified embodiment of the invention will now be described by reference to the accompanying drawings in which:

Figure 1 shows, in axial section, the servo-pilot valve, the pilot float valve, the relief and unloading valve, and shows in diagrammatic elevation, the pump or equivalent source of pressure liquid and the flow connections for these components.

Figure 2 shows the double acting motor and the follow-up linkage in elevation with parts broken away (to reduce the size of the view), shows the piloted valve and the related discharge restraining valve both in axial section, and shows in diagrammatic elevation the flow connections for the stated components.

The two figures, when assembled left to right in their numerical order afford a diagram of the complete hydraulic system. When Figures 1 and 2 are so assembled it will be apparent that a terminal portion of the follow-up linkage extends into Figure 1. All sections are diagrammatic to the extent that ports are drawn as if all lay in the planes of section. Any passage affording continuous unrestricted communication will be identified by a single reference numeral. All connections to sump will be indicated by a diagrammatic symbol and the legend "sump" and may be taken as indicating connection to one and the same container for hydraulic liquid. Since most hydraulic liquids are oils the word "oil" will be used as a generic designation for hydraulic liquid.

The pump 7 draws oil from the sump through one of the sump connections 22 and delivers it to line 14 which leads to the relief and unloading valve 8. This valve controls unloading of the pump and also provides for metered flow to the line 15 through which the pilot float valve 10 and the servo-pilot valve 9 are supplied with pressure fluid.

The double-acting expansible chamber motor 11 appears in Figure 2 and has a piston rod 12 which actuates the bulldozer blade. This motor is controlled by the piloted valve 13, later to be described.

Flow and pressure connections are provided as follows, and their details will be elaborated in connection with the description of the various valve units:

Pump 7 discharges into line 14 which has branches leading to the relief and unloading valve 8 and to the piloted valve 13. The connection 15 conducts metered oil under pressure from the body of valve 8 to the body of pilot float valve 10, as will be described.

Connection 16 extends between the body of pilot float valve 10 and the body of servo-pilot valve 9.

Connection 17 extends between the body of piloted valve 13, the body of servo-pilot valve 9 and the body of pilot float valve 10. It is one of the two connections through which the piloted valve 13 is controlled. The other of the two connections is 18 which leads between the body of pilot float valve 10 and the body of piloted valve 13.

Connection 19 leads from the housing of piloted valve 13 to the lower working space of motor 11 and connection 21 leads to the upper working space of this motor. The piston has a somewhat larger effective area exposed to pressure in the upper working space, because there is no tail rod. The piston and its rod are biased downwardly by gravity.

There are several sump connections all designated by the numeral 22, since it is unnecessary to distinguish between them. They all deliver liquid to the sump by paths immaterial to the invention.

That being the general layout, the details of the various units can now be elaborated.

Servo-pilot valve

Supported fixedly on the chassis of the bulldozer is a housing 25 having a horizontal guideway for the body 26 of the servo-pilot valve. This body is moved horizontally, as the piston rod 12 moves, by a follow-up linkage, shown in simplified form as a bell crank 27, mounted on a chassis-supported fulcrum 28, and having a pin-and-slot connection 29 with rod 12. A link 31 is hinged to the second arm of the bell crank at 32 and to the body 26 at 33. The linkage should be such that the full stroke of piston rod 12 moves body 26 through its desired range of motion.

The body 26 has an axial bore 34 closed at its right end by the cap which carries hinge 33, and dimensioned to receive the valve plunger 35. This has an undercut 36 between lands, and slides through a bore at the left end of body 26. The sliding joint is sealed by O-ring 37.

An actuating handle 38 is hinged to the valve plunger and to a link 39 which is hinged also to bracket 41 on housing 25. A graduated arc 42 may be provided to indicate valve positions, which (as will be made clear) are directly related to positions of piston rod 12.

An equalizing passage 43 and a sump connection 22 are provided to render the valve plunger indifferent to pressure.

Encircling the bore 34 are three ports, a port 16a of considerable length, to which controlled connection 16 leads, a shorter port 17a to which supply connection 17 leads and an exhaust port 22a in communication with equalizing passage 43 and a sump connection 22. Because the body 26 moves, the connections 16, 17 and 22 are shown with flexible hose portions.

When the pilot float valve 10 is in "run" position and servo-pilot valve consequently is in control, 17 serves as the pressure fluid supply connection to the servo-pilot valve, and connection 16 is connected to the main pilot connection 18. Undercut 36 is long enough to bridge ports 22a, 16a and 17a and under balanced conditions does not throttle outflow through 17 more severely than flow to connection 15 is throttled at 77. If handle 38 is moved from the balanced position valve 9 throttles outflow from 15 and 17 and the valve 8 converts from a low pressure unloading valve to a high pressure relief valve as will be explained.

Pilot Float valve

The body of valve 10 has an axial plunger bore 44 and a coaxial counterbore 45 which ends in shoulder 46. A cap 47 closes the outer end of the counterbore and serves as a limit stop for inward motion of the valve plunger. This plunger comprises from left to right an actuating knob 49, a land 51 which coacts with seal ring 52, an undercut 53, a short land 54, a longer undercut 55, a cam lobe 56 which leads to a detent groove 57 separated by an annular ridge from a second detent groove 58.

A spring seat 48 is urged against shoulder 46 by a spring 59 which reacts between it and cap 47. The spring seat 48 has an amount of lost motion upon the end of the valve plunger equal to the spacing of grooves 57 and 58 which are engaged by spring-urged ball detents 61.

The plunger has three positions designated in Figure 1 by legends as "run," "float" and "start to float." In run position, shown in Figure 1, the detents engage groove 58, and in float position they engage groove 57. In this position the plunger has exhausted its lost motion relatively to spring seat 48 so further motion to start to float position is resisted by spring 59. Hence the plunger must be held manually in start to float position and when released will be returned to float position by spring 59.

The lands and grooves in the valve plunger, control encircling port grooves in the seat, as follows:

Two end exhaust ports 22b which are connected together and to sump.

Port 16b to which connection 16 leads.
Port 18b to which connection 18 leads.
Port 15b to which pressure connection 15 leads.
Port 17b to which connection 17 leads.

The connections established in the three positions are:

Run position; 15b and 17b connected, also 16b and 18b connected.

Float position; 15b and 17b connected together and to sump port 22b; 16b and 18b each blanked.

Start to float position, 15b and 18b connected, 16b blanked and 17b connected to exhaust port 22b.

Relief and unloading valve

The housing of valve 8 comprises a body 62, a cap 63 and a combined valve body and cap 64. The body 62 is bored axially from end to end and at its right hand end is counterbored to receive a centrally ported valve seat disc 65 which is retained by cap 63. The cap is held by machine screws (not shown) and is sealed to the body and seat disc by O-rings visible in Figure 1. The axial bore is encircled by three port grooves, namely an exhaust port 22c which is near mid-length and leads to the sump connection 22, and two supply ports 14b and 14c to each of which pressure connection 14 leads. The seat port in seat disc 65 leads to sump connection 22 via passage 66. This ports extends through portions of cap 63, body 62 and combined valve-body and cap 64.

Reciprocable in the axial bore is a piston valve comprising two piston heads 67, 68 connected by a stem 69. The head 67 is counterbored from the left end to receive a coil compression spring 71 which seats against cap 64 and biases the valve to the right. At its right hand limit of motion, a valve nose 72 closes the port in seat 65, and piston heads 67, 68 isolate exhaust port 22c. The first leftward motion vents connection 14 via 14c and the port in seat disc 65. After head 68 has fully exposed port 14c, head 67 starts to expose port 14b, thus greatly enlarging the exhaust area.

The cap 64 houses a relief valve unit comprising a conical valve 73 urged toward its seat 74 by a coil compression spring 75. The stress on spring 75 is adjustable by means of a screw 76 which is sealed and can be locked in adjusted positions by conventional means clearly shown in Figure 1.

A slender port 77 leads from line 14 to chamber 78, and is further restricted by a metering pin 79. Interchange of pins 79 of different diameters affords adjustments of flow rate both to branch connection 15 and to chamber 78. It should be observed that pressure in chamber 78 is always effective over the entire end face of piston head 67, and further that the restricted path from line 14 to branch connection 15 is significantly shorter than that to chamber 78, so that changes of pressure in chamber 78 lag behind changes of pressure in branch connection 15. As a result, transitory changes in pressure in line 14 have little or no effect on the position of valve nose 72. When valve 73 opens outflow is via a branch of passage 66 to sump connection 22.

Metering pin 79 restricts flow to connections 15 anl 17, about the same amount as the flow from 17a to 22a is restricted when plunger 35 is in its neutral position relative to body 26. However, motion from that neutral position in either direction increases throttling at 17a or 22a creating a rising back pressure in 78 which starts valve 72 in its closing direction. Hence motion of handle 38 from any balanced position in either direction loads the pump. The effect is cumulative, and in extreme cases could continue until valve 73 opens.

Piloted valve

The housing of valve 13 comprises a body 81 with end caps 82 and 83, and a main valve chamber bore 84. Coaxial with bore 84 is a slightly larger bore 85 which leads to a still larger chamber 86. An exhaust groove 22d with sump connection 22 encircles bore 85 at the shoulder which marks the junction of bore 85 with valve chamber bore 84.

The valve element of the piloted valve is of the piston type and comprises two spaced piston heads 98 and 99 which perform no valve functions (99 being a motor piston), and two valve heads or lands 102, 103 which control the connection of two motor ports alternatively to supply and exhaust ports, all of which ports encircle bore 84. The parts 98, 99, 102 and 103 are spaced by a coaxial stem 101 which has a coaxial extension 88 beyond piston head 98. Extension 88 functions under pressure in line 17 as a biasing piston.

The extension 88 is reduced in diameter to the left of shoulder 91 to receive and slidably guide two annular spring seats 92 and 93 between which a coil compression spring 89 reacts. The spring and spring-seat assembly is housed in a cup-shaped stop-plunger 87 which is guided in bore 85. The seat 92 engages the closed end of the stop plunger 87 and the seat 93 is retained by a removable snap ring 94.

The extension 88 makes a good sliding fit in a guideway formed through the closed end of stop plunger 87 and is sealed by an O-ring 90. The stop plunger 87 is impositively retained selectively in its two limiting positions by spring urged ball detents 95 which engage one or the other of the two grooves 96, 97 which encircle the plunger 87.

The piston head 99 is subject on its right hand face to pressure in cylinder space 104 to which connection 18 leads. The piston head 98 is not subject to pressure on its left hand face, because groove 22d is vented. Pressure in chamber 86 reacts to the right on the cross sectional area of extension 88 which is approximately one-third of the area of piston head 99. The piston head 99 is basically the piloted motor, so that control is exercised by variations of pressure in line 18. However, extension 88 also functions as a piston subject to pressure in line 17 and urges the valve stem 101 and piston head 99 to the right. Hence the piloted motor can be regarded as comprising piston head 99 and extension 88 acting as an opposed piston.

The bore 84 is encircled by groove ports as follows:

At about mid length, two pressure ports 14d supplied by line 14. A single port of the same aggregate width could be used but division into two was adopted to improve the guiding action.

Two cylinder ports 21d and 19d respectively on opposite sides of ports 14d and communicating with motor connections 21 and 19.

Two controlled discharge ports 105 and 106 which are connected together at 107 and lead to the bore 108 of a discharge controlling valve where they terminate in bore-encircling port grooves 109 and 111.

The valve heads 102 and 103 lap the cylinder ports 21d and 19d in the position illustrated in Figure 2. When displaced in one or the other direction they perform the familiar function of connecting a selected one of the ports 21d, 19d to supply (port 14d) and the other to a discharge port 105 or 106 each connected to passage 107. The valve mechanism in bore 108 controls exhaust flow from passage 107.

The right hand end of bore 108 is closed by an axially ported plug 112 which seals at flange 113 and is sustained by stand-off lugs 114 engaged by cap 83. It has a central bore 115 in which a plunger 116 is reciprocable. The plunger 116 is urged to the left by oil under pressure supplied from connection 14 by passage 117 to space 120 and carries a slender thrust stem 118 which reacts on the nose 119 of the valve element comprising two piston heads 121, 122 connected by stem 123. The nose 119 controls the axial port in plug 112.

The left hand end of bore 108 is closed by a plug 124. This plug and also piston head 121 are axially bored to receive a coil compression loading spring 125. A port 126 with metering pin connects passage 107 and the space to the left of piston head 121. The metering pin may be interchanged with others of different diameters to adjust the net flow capacity of port 126. Port 127 is a discharge port.

Operation by servo-pilot valve

The undercut 36 is of such length that valve plunger 35 has "negative lap" (i. e. clearance) as to the supply port 17a and the exhaust port 22a. With handle 38 in a neutral position, relatively to valve body 26, pressure in lines 15 and 17 will be low and valve 8 unloads the pump. If handle 38 is drawn to the left, port 17a is throttled and 22a is opened wider. Pressure in connection 16 falls as the result, but back pressure in line 15 rises. Motion of handle 38 to the right has the reverse effect, 22a is throttled, 17a is open wider and pressure in connection 16 rises. However, back pressure in 15 rises in this case also. As above explained this rise of back pressure in line 15 causes valve 8 to load the pump and raise the pressure in line 14.

Limiting the statement to conditions when servo-pilot valve 9 is in control, the servo-pilot valve 9 effects loading of the pump whenever it is away from its neutral position, but in any neutral position effects unloading. Obviously there is a different neutral position of plunger valve 35 for every position of motor 11 and the connected valve body 26.

With actuating knob 49 of the pilot float valve in "run" position connection 16 and connection 18 communicate, and the pressure in 17, whatever it may be, is continuously effective in chamber 86 to hold stop-plunger 87 in its right-hand position (shown in Figure 2), and to load extension 88.

Motion of handle 38 in one or the other direction from a neutral position raises or lowers the pressure in connection 16 and consequently in connection 18 and cylinder space 104. The pressure change in connection 17 is effective only on the small area of extension 88 and the resulting force on stem 101 is comparatively small. Thus control under the servo-pilot valve is effected chiefly through the connection 18 and consequently is readily terminable by interrupting that connection which is open through the pilot float valve only when the latter is in its "run" position illustrated in Figure 1.

The relationship between the servo-pilot valve 9 and the relief and unloading valve 8 is the most significant detail of the invention. When chamber 78 is vented to sump via connection 15 valve 8 functions as a low pressure unloader. When connection 15 becomes part of a closed hydraulic circuit valve 8 converts to a high pressure relief valve. Valve 9 effects this change in consonance with its own functions.

The action can be traced as follows:

Assume that the pilot float valve is in its "run" position (as shown) that handle 38 has been set in some definite position, and that responsively motor 11 has moved until a neutral condition is reached and the pump 7 is unloaded.

With such conditions in effect, handle 38 is moved to the right. Oil flows initially at idling delivery pressure through port 77 lines 15 and 17 to groove 16a from which outflow is blocked or at least throttled by plunger 35 which obstructs the discharge path from the left end of groove 16a. Flow continues through port 77 and chamber 78 to the space at the left of piston head 67 and through line 17 to chamber 86 at the left end of piloted valve 13 and via lines 16, 18 to cylinder space 104 at the right end of valve 13. As a consequence, piston heads 67—68 move to the right and the exhaust path from 14b to 22c is throttled, so that pump delivery pressure rises. There are attendant pressure-rises in chamber 86 and cylinder space 104 of valve 13 and in chamber 78 of valve 8. The valve stem 101 in valve 13 moves to the left until it abuts stop plunger 87, in which position the valve connects pump discharge line 14 with line 21 leading to the head end of motor 11 and line 19 from the rod end of that motor to discharge port 106.

Continued motion of piston heads 67—68 to the right causes continued rise of delivery pressure, the effect being intensified by gradual closing of the port in seat 65 by valve nose 72. Port 14d is connected by passage 117 to space 120 to the right of plunger 116, and rising pressure in port 14d reacts through plunger 116 and stem 118 on valve nose 119 to resist its closing motion. Thus the valve unit 121, 122, 119 is urged to the right by discharge pressure in line 19 from motor 11 acting on the full area of 121 and is urged to the left by the same pressure acting on a major portion of the area of 122. The resultant is a moderate force to the right and is assisted by spring 125. However, the effective area of plunger 116 under pump delivery pressure develops a dominant force to the left, so that discharge through motor connection 19 occurs through ports 106 and 111, past 119, and through 127 to the sump.

As a consequence of the above, rising pump delivery pressure tends to open the discharge path and rising pressure in the exhaust passage tends (subject to delay imposed by the pin in port 126) to throttle the exhaust passage, but only to a limited extent. Careful proportioning of parts results in action in which the motor 11 moves under positive pressure in one working space and exhaust from the other working space is restrained so as to develop back pressure. In this way, cavitation of the motor is minimized or even prevented.

Motor 11 can accelerate rapidly. Flow from line 14 through 14d and line 21 to motor 11 can increase rapidly. The valve unit 67, 68, 72 can move to the right until it closes and the entire pump delivery flows to motor 11. At such time valve unit 121, 122, 119 throttles exhaust flow through port 127, and release flow depends on motor delivery pressure acting on plunger 116 to reduce the throttling effect. Thus restraint on motion is imposed in such a way as to keep motor spaces liquid-filled, the effect being controlled by pump delivery pressure which is a function of the rate of pump delivery.

Assume that the blade has been forced down so far as to lift the end of the vehicle, and that the handle 38 is moved to the left to lower the vehicle. The motion is controlled in the reverse sense, but basically in the same manner. The stem 101 is displaced in the opposite direction (i. e. to the right) and connections 19 and 21 are interchanged so that supply is to 19 and discharge is from 21.

*Operation by pilot float valve*

The primary function of the pilot float valve 10 is to disconnect lines 16 and 18 which it does by blanking port 16b in both "start to float" and "float" positions. In "start to float" valve 10 exhausts port 17b (so that chamber 86 is vented) and connects supply connection 15 through 15b, 18b and line 18 with cylinder space 104, so that back pressure in line 18, effective in chamber 78, loads the pump by closing the unloading valve, if not already closed, and piston head 99 moves stem 101 to the left, over-powering spring 89 and forcing stop-plunger 87 full stroke to the left. This puts the stem 101 in it float position, in which ports 19d, 21d, 14d, 105 and 106 freely communicate.

In float position of pilot float valve 10, port 18b is blanked so that liquid trapped in cylinder space 104 hydraulically locks stem 101 of piloted valve 13 in its float position. Connection 17 is concurrently connected via undercut 55 with supply port 15b and one of the exhaust ports 22b. This unloads the pump by venting chamber 78.

Observe that spring 59 resists motion of actuating knob 49 from "float" to "start to float" position and returns the knob 49 only to "float" position. Return to "run" position is manually effected.

The foregoing three paragraphs outline the characteristics of the pilot float valve 10. It remains to detail the effects on the piloted valve 13.

The purpose of "start to float" position is to prepare the system for "float," and thereupon to allow "floating down" or "floating up" of the blade motor 11 with minimum risk of cavitation. "Float" is accomplished as usual by joining the two ends of the hydraulic motor simultaneously with a pressure source and an exhaust path. Then external forces reacting on the blade can move it.

When actuating knob 49 is pushed into "start to float" position, undercut 53 spans ports 15b and 18b, causing flow from connection 15 to cylinder space 104 where the fluid acts against the right end of piston head 99. Since the spring 89 and stop plunger 87 offer some initial resistance to movement, motion of stem 101 will be slightly delayed. Simultaneously, with the bridging of ports 18b and 15b by undercut 53, ports 17b and 22b are bridged by undercut 55. Thus, chamber 86 is connected to sump, so that there is no sustained pressure in chamber 86 to resist movement of piston head 99 and the connected piloted valve stem 101.

Before flow in line 18 and motion of stem 101 start, pressures in connections 14 and 15 start to equalize. Hence valve nose 72, if open, tends to close under the urge of the spring 71. If valve nose 72 is closed, or approaching closed position, pressure in connections 14 and 15 will build up until it becomes of sufficient magnitude to overcome the resistance offered by the centering spring 89. When this occurs, piston head 99 of the piloted motor and stem 101 will start to move to the left. When piston head 98 engages stop-plunger 87, the stop-plunger will be forced to the left and will be shifted until it contacts the bore closure cap. The valve is then in "float" position in which ports 21d, 19d and 14d, and passage 107 of piloted valve 13 are directly interconnected. This assures pressure equalization between the interconnected ports and passage 107 and also between them and the space to the left of piston head 121, the space 120 (via passage 117) and port groove 111.

Because of the equalization of pressure in the space to the left of piston head 121, port groove 111, space 120, and the fact that the aggregate area of piston head 122 and plunger 116 is greater than the area of piston head 121, valve nose 119 will unseat as the pressure rises. Spring 125 is so selected that unseating will begin when the pressure reaches 50 p. s. i. and will be complete when the pressure reaches 100 p. s. i.

As piston head 99 of the piloted motor moves to the left, the volume of cylinder space 104 increases and, as a result, there may be a small reduction in pressure in connections 18, 15 and 14 and in chamber 78.. The pressure in port 14c, therefore, may tend to open valve nose 72 and unload the pump. If the valve does open, it will do so only momentarily because the amount of oil required to displace piston head 99 is relatively small. This slight and momentary opening of valve nose 72 does not greatly reduce the pressure in connection 14, hence movement of piston head 99 still continues. When piston head 99 has reached the limit of its leftward movement, there can be no further flow to cylinder space 104, and valve nose 72 will again be seated by virtue of the equalization of pressures in connections 14 and 15 and the urge of spring 71.

When valve nose 72 closes, full pump volume will be delivered to connection 14. If motor 11 be in elevated blade position when actuating knob 49 is set in "start to float" position, the weight of said blade will induce a flow in line 19 toward port 19d. Outflow from motor connection 19 will tend to enter motor connection 21. Since the head end displacement is larger than that of the rod end, the volume of such outflow is insufficient to keep the connection 21 filled. Hence, pump flow from connection 14 is directed to connection 21 to resist cavitation.

When the falling blade stops, there will be an excess of fluid directed toward connection 21 and pressure in passage 107 will rise. This increase in pressure will be reflected in the space to the left of piston head 121, in port 111 and in passage 117. As soon as this pressure exceeds 50 p. s. i., valve nose 119 will unseat to allow exhaust of excess fluid to the sump. If valve nose 119 is moved off its seat far enough to allow a reduction in pressure in passage 107 to less than 50 p. s. i., the spring 125 will tend to close valve nose 119, thus increasing the restriction to flow and again increasing the pressure in passage 107. A positive pressure of at least 50 p. s. i. is thus assured in passage 107 and ports 21d, 19d, and 14d. As a consequence, cavitation in motor 11 is resisted. With the condition just described prevailing, the operator may float his blade down and still be assured that when the blade touches the ground, the motor will be so nearly liquid-filled that approximately instantaneous response is available when actuating knob 49 is returned to its "run" position.

If the occasion should arise to float the blade upward from a digging position, the placing of knob 49 in "start to float" position will allow this floating upward in a manner similar to that just noted for floating the blade downward. It should be remembered that for floating up, the tractor should be moving backward.

Actuating knob 49 is put into "float" position only when back dragging or grading is required. That is, with the blade on the ground and the tractor moving backward. With knob 49 thus positioned, the system will allow movement of the blade and motor 11 by outside forces while still allowing by-passing of the pump flow by means of valve nose 72 which then functions as a low pressure unloading valve. Float position of knob 49 allows spanning of ports 15b, 17b, and 22b by undercut 55 thus to allow bleeding of connection 15 to sump. Bleeding of connection 15 prevents development of pressure in connection 14 and against the left side of piston head 67. Thus valve nose 72 is unseated at a relatively low pressure, for only the bias spring 71 must be overcome.

With piston head 99 in its float position, ports 21d, 19d and 14d, passage 107 and associated passages are in common communication as described for the "start to float" position of actuating knob 49. Since valve nose 72 is unseated and since it is now operating as an unloading valve, the pressure in port 14c and line 14 will be maintained at a value less than 50 p. s. i. With this condition prevailing at ports 21d, 19d, and 14d, and passage 107, valve nose 119 will remain seated. The positive pressure maintained in said ports and chamber, even though less than 50 p. s. i., is sufficient to prevent cavitation in motor 11 when the blade is moved as a result of outside forces. The small positive pressure also assures blade movement with a minimum resistance.

From the above description of operation it will be seen that the device has many desirable characteristics.

With the pilot float valve in "run" position, so that the servo-pilot valve is in control, the operator has full control, and can cause the motor to move in consonance with motion of the control handle 38. This is true both as to speed and range of motion. When motion of the servo-pilot control handle stops, the motor will stop in the corresponding position with the piloted valve in "hold" position so that the motor is hydraulically locked. In "hold" position the pump is unloaded.

Regardless of motion or position, float conditions can be established, smoothly and safely, by actuating the pilot float valve, which overrides the servo-pilot control merely by interrupting hydraulic connections. The blade does not drop or move suddenly in any direction at the inception of float conditions.

When the operator wishes to resume pilot control, and to do so with the blade set in a particular position, he first sets the servo-pilot valve handle 38 in the corresponding position and then moves the pilot float handle to "run" position. The effect is to connect 15 with 17 and 16 with 18, and load the pump by urging valve nose 72 to close. Charging of connection 17 moves stop plunger 87 to the right to its normal position. This restores the servo-pilot valve to control. The motor will, at once, move toward, and stop at the desired position, with the piloted valve in "hold" position, so that the blade is hydraulically locked in the desired position. The pump then is unloaded as before described.

Failure of the supply of hydraulic liquid while under servo-pilot control entails no danger, because upon such failure the centering spring moves the piloted valve to "hold" position and hydraulically locks the motor.

Failure of the supply of hydraulic liquid while the pilot float valve is in float position is not dangerous because the blade is then in contact with the ground.

A preferred embodiment has been described in detail, but details are subject to variation and modifications are contemplated, within the scope of the claims.

What is claimed is:

1. The combination of a continuous source of pressure liquid; a double-acting expansible chamber motor; a distributing valve having a supply connection fed by said source, a discharge, port connections to respective working spaces of said double-acting motor, and piloted pressure-motor means responsive to a variable piloting pressure and serving to shift said valve reversely to different functional positions in which the double-acting motor is caused to move in relatively reverse directions, said valve moving through a mid-position in which the motor is hydraulically locked; at least one pilot pressure connection to said piloted pressure motor means; relief and unloading valve means responsive to the demand for pressure-liquid and serving in response to low demand to vent said pressure-liquid source against a low back pressure; and a servo-pilot valve having two relatively movable ported components, one connected to be moved by the double-acting motor and the other having means by which it may be manually shifted, one of said components having a supply port fed by the pressure-liquid source, a discharge port and a port from which said pilot pressure connection leads, and the other component having a port dimensioned to connect all three ports of the first component and graduate in reverse senses the flows through the supply and discharge ports.

2. The combination with the structure defined in claim 1 of double-acting centering spring means normally reacting on said distributing valve to urge it to said mid-position.

3. The combination of the structure defined in claim 1 in which the distributing valve is capable of over-travel to a float position in which it connects both working spaces of the double-acting motor with both its supply and discharge; with stop means shiftable in a path alined with the path of the distributing means through a range of travel commensurate with said over-travel; impositive detent means for retaining said stop means at each limit of its travel; double-acting centering spring means reacting between said stop means and said distributing valve; and a pilot float valve operable to disconnect said pilot pressure connection from said servo-pilot valve and subject said piloted pressure motor means to high pressure whereby the imposive detent means are overpowered and the distributing valve is forced to float position.

4. The combination defined in claim 3 in which the piloted pressure motor means is double-acting and the pilot float valve is shiftable between two positions in which respectively it causes the distributing valve and said stop means to move between said float and said centered positions.

5. The combination of the structures defined in claim 1 in which the distributing valve is capable of overtravel to a float position in which it connects both working spaces of the double-acting motor with both its supply and discharge; with stop means shiftable in a path alined with the path of the distributing valve through a range of travel commensurate with said over-travel; impositive detent means for retaining said stop means at each limit of its travel; double-acting centering spring means reacting between said stop means and said distributing valve; and a float pilot valve operable to disconnect said pilot pressure connection from said servo-pilot valve and subject said piloted pressure motor means to high pressure whereby the impositive detent means are overpowered and the distributing valve is forced to float position; and a flow controlling valve serving to develop back-pressure on discharge flow through said distributing valve, whereby cavitation in the motor is resisted.

6. The combination defined in claim 1 in which the pressure-liquid from said source develops a relatively small biasing force on the piloted valve in opposition to pressure in said pilot pressure connection.

7. The combination of the structure defined in claim 1 in which the distributing valve is capable of over-travel to a float position in which it connects both working spaces of the double-acting motor with both its supply and discharge; with stop means shiftable in a path alined with the path of the distributing valve through a range of travel commensurate with said over-travel; impositive detent means for retaining said stop means at each limit of its travel; double-acting centering spring means reacting between said stop means and said distributing valve; a float pilot valve operable to disconnect said pilot pressure connection from said servo-pilot valve and subject said piloted pressure motor means to high pressure, whereby the impositive detent means are overpowered and the distributing valve is forced to float position; and a pressure-responsive flow-controlling valve arranged to throttle exhaust flows through said distributing valve, said flow-controlling valve being urged in an opening direction by pump delivery pressure effective at the distributing valve and in a closing direction by the pressure of the exhaust flow which it throttles, whereby the flow-controlling valve serves to keep the motor filled with liquid under pressure.

8. The combination of a continuous source of pressure liquid; a discharge; a piloted pressure-motor; a servo-pilot valve comprising relatively movable valve and valve seat elements said seat element having a supply port connected with said source, a discharge port and a port connected with said piloted motor, said valve element controlling said supply and discharge ports and serving to maintain flows from the source to the piloted motor port and from the piloted motor port to discharge and to graduate said flows in relatively reverse senses as to each other and also according to the direction of displacement of the valve relatively to its seat, whereby there is an intermediate relative position of valve and seat at which back pressure on said source is minimum; and a pressure-responsive valve subject to back pressure on supply, controlling a connection between source and discharge, and serving to throttle the last-named connection progressively as said back pressure rises above said minimum.

9. The structure defined in claim 8 in combination with a piloted valve actuated by said piloted pressure-motor; a main motor controlled by said piloted valve; and follow-up means effective between the main motor and said servo-pilot valve.

10. The structure defined in claim 8 in combination with a balanced piston valve actuated by said piloted pressure-motor; a double acting main hydraulic motor controlled by said balanced valve; and follow-up means effective between the main hydraulic motor and said servo-pilot valve.

References Cited in the file of this patent

UNITED STATES PATENTS

| | | |
|---|---|---|
| 2,221,150 | Rebeski | Nov. 12, 1940 |
| 2,451,013 | Ziskal et al. | Oct. 12, 1948 |
| 2,575,507 | Acton | Nov. 20, 1951 |
| 2,608,954 | Hogan | Sept. 2, 1952 |
| 2,679,234 | Robinson | May 25, 1954 |
| 2,755,624 | Klessig | July 24, 1956 |